United States Patent
Semel

(10) Patent No.: US 11,110,778 B2
(45) Date of Patent: Sep. 7, 2021

(54) HEAT PUMP SECONDARY COOLANT LOOP HEAT EXCHANGER DEFROST SYSTEM FOR A MOTOR VEHICLE

(71) Applicant: FORD GLOBAL TECHNOLOGIES, LLC, Dearborn, MI (US)

(72) Inventor: Ronald Richard Semel, West Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 270 days.

(21) Appl. No.: 16/272,112

(22) Filed: Feb. 11, 2019

(65) Prior Publication Data

US 2020/0254848 A1 Aug. 13, 2020

(51) Int. Cl.
*B60H 1/32* (2006.01)
*B60H 1/00* (2006.01)
(Continued)

(52) U.S. Cl.
CPC ......... *B60H 1/321* (2013.01); *B60H 1/00385* (2013.01); *B60H 1/00785* (2013.01); *B60H 1/00885* (2013.01); *F25B 47/025* (2013.01); *F25D 21/006* (2013.01); *F25D 21/04* (2013.01); *F25D 21/06* (2013.01); *F25D 21/08* (2013.01);
(Continued)

(58) Field of Classification Search
CPC .. F25B 47/022; F25B 47/025; F25B 2500/31; B60H 1/321; B60H 1/00899; B60H 1/00907; B60H 1/00914; B60H 1/00385; B60H 1/00785; B60H 1/00885; B60H 2001/00961; B60H 2001/00171;
(Continued)

(56) References Cited

U.S. PATENT DOCUMENTS 5,921,092 A 7/1999 Behr et al.
7,063,137 B2 6/2006 Kadle et al.
(Continued)

OTHER PUBLICATIONS

Nicholas Carsten Lemke et al, Secondary Loop System for Automotiv HVAC Units Under Different Climate Conditions, Purdue e-Pubs, Purdue University, School of Mechanical Engineering (2012), Paper 1282; http://docs.lib.purdue.edu/iracc/1282.

*Primary Examiner* — Cassey D Bauer
*Assistant Examiner* — Daniel C Comings
(74) *Attorney, Agent, or Firm* — David Coppiellie; Price Heneveld LLP

(57) ABSTRACT

A cooling and heating system for a motor vehicle comprises a heat pump, a controller, a low temperature radiator in thermal communication with the heat pump, a passenger cabin heat exchanger in thermal communication with the heat pump, and a defrost system comprising a bypass coolant loop in selective fluid communication with the low temperature radiator. When in the heating mode, the controller opens a solenoid valve and activates a coolant heater in the bypass coolant loop upon detecting operation of the heat pump outside of a predetermined normal operating range and upon detecting an ambient temperature below a predetermined temperature. The controller de-activates the coolant heater upon detecting operation of the heat pump within the predetermined normal operating range. The controller may also de-activate close the solenoid upon detecting operation of the heat pump within the predetermined normal operating range.

20 Claims, 8 Drawing Sheets

(51) Int. Cl.
   *F25B 47/02* (2006.01)
   *F25B 21/00* (2006.01)
   *F25D 21/04* (2006.01)
   *F25D 21/00* (2006.01)
   *F25D 21/06* (2006.01)
   *F25D 21/08* (2006.01)
(52) U.S. Cl.
   CPC .............. *B60H 2001/00961* (2019.05); *F25B 2500/31* (2013.01); *F25B 2700/11* (2013.01)
(58) Field of Classification Search
   CPC ........ F25D 21/006; F25D 21/04; F25D 21/06; F25D 21/08; F25D 17/00
   See application file for complete search history.

(56) References Cited

U.S. PATENT DOCUMENTS

| | | | |
|---|---|---|---|
| 9,823,009 | B2 | 11/2017 | Ragazzi |
| 9,879,891 | B2* | 1/2018 | Kowsky ................ F25B 47/022 |
| 2005/0172648 | A1 | 8/2005 | Concha et al. |
| 2011/0016903 | A1 | 1/2011 | Ballet et al. |
| 2015/0308719 | A1 | 10/2015 | Gebbie et al. |
| 2015/0308731 | A1 | 10/2015 | Viklund et al. |
| 2016/0332504 | A1 | 11/2016 | Blatchley et al. |
| 2017/0008407 | A1 | 1/2017 | Porras et al. |
| 2020/0208900 | A1* | 7/2020 | Lavrich ................ B60H 1/321 |

* cited by examiner

HEAT PUMP SECONDARY COOLANT LOOP HEAT EXCHANGER DEFROST SYSTEM FOR A MOTOR VEHICLE

FIELD OF THE DISCLOSURE

The present disclosure generally relates to a heat pump based cooling and heating system for a motor vehicle. More specifically, the present disclosure relates to a defrost system for a heat pump secondary coolant loop heat exchanger of the cooling and heating system.

BACKGROUND OF THE INVENTION

Heat pumps may be used in the cooling and heating system of hybrid motor vehicles or entirely battery powered electric motor vehicles, since a heat pump can be used for both cooling and heating the inside passenger cabin in the absence of the heat source provided by traditional internal combustion engines. As used herein, the term "heat pump" refers to a vapor-compression refrigeration device optimized for high efficiency in both directions of thermal energy transfer. Such heat pump systems employ a refrigerant as the working fluid in circulation between a compressor, an evaporator, an expansion valve, and a condenser. Since the operation of heat pumps may be reversible, heat pumps may be adapted to work in either direction, e.g., in both a cooling mode and a heating mode to provide cooling or heating to the inside passenger cabin.

In the cooling mode, a heat pump operates in the same manner as a traditional air-conditioning system. In the heating mode, a heat pump is more efficient than simple electrical resistance heaters and may be three to four times more effective at heating than such electrical resistance heaters using the same amount of electricity. However, the typical cost of installing a heat pump is also higher than that of an electrical resistance heater.

Heat pump systems may comprise a single loop system, where the refrigerant flows through a passenger cabin heat exchanger, as well as an outside heat exchanger, sometimes referred to as an OHX, which is generally the same system used in traditional air-conditioning systems. Unlike traditional air-conditioning systems, a heat pump also flows refrigerant when in the heating mode.

However, when heat pumps are operated under cold conditions, such as 0° C., the moisture in the outside air can condense on the outside heat exchanger and freeze, diminishing the performance of the outside heat exchanger. In such systems, frost and ice buildup on the outside heat exchanger of a heat pump system has a significant impact on performance during cold ambient temperature operation. To address this issue, a single loop heat pump can run in reverse (that is, in the cooling mode) for a short period of time and thereby thaw the outside heat exchanger.

Heat pump systems may also include one or more secondary coolant loop system that use a conventional coolant mixture, such as a water-glycol mixture, as the working fluid. Unlike conventional heat pump systems, such systems do not employ refrigerant flowing through the passenger cabin or the outside heat exchanger. Rather, the heat pump refrigerant remains in a self-contained unit. The heat pump refrigerant in turn either removes heat from or rejects heat to a coolant in the secondary loop system. The coolant in the secondary loop system thus flows through a passenger cabin heat exchanger within the inside passage cabin and the outside heat exchanger to provide the required cooling and heating.

A disadvantage to such systems, however, is ice/frost formation on the outside heat exchanger. Since only coolant flows through the outside heat exchanger, there is no ready method to warm the outside heat exchanger in the event of ice/frost formation. Unless the outside heat exchanger is thawed, system performance will diminish. Unlike heat pump systems that use a single loop system, the heat pump cannot be simply run in reverse to use the refrigerant to defrost and/or de-ice the outside heat exchanger. That is, a heat pump system using a secondary coolant loop does not have this capability since the coolant, and not the refrigerant, is run through the outside heat exchanger. Unlike a refrigerant-based system, the secondary coolant loop system does not have the capability of defrosting and/or de-icing the outside heat exchanger. System performance will degrade.

Accordingly, a cooling and heating system including a heat pump system comprising one or more secondary coolant loop systems used in a hybrid motor vehicle or battery powered electric motor vehicle that operates under all ambient conditions and provides the capability of defrosting/de-icing the outside heat exchanger is desired.

SUMMARY OF THE INVENTION

According to a first aspect of the present disclosure, a cooling and heating system for a motor vehicle comprises a refrigerant-based heat pump having a first side heat exchanger and a second side heat exchanger, wherein the heat pump is adapted to operate in a cooling mode and a heating mode and a controller controls operation of the cooling and heating system. A first secondary coolant loop comprises a low temperature radiator, the low temperature radiator being in thermal communication with the first side heat exchanger of the heat pump when the heat pump is in the cooling mode and the low temperature radiator being in thermal communication with the second side heat exchanger of the heat pump when the heat pump is in the heating mode. A second secondary coolant loop comprises a passenger cabin heat exchanger, the passenger cabin heat exchanger being in thermal communication with the second side heat exchanger of the heat pump when the heat pump is in the cooling mode and the passenger cabin heat exchanger being in thermal communication with the first side heat exchanger of the heat pump when the heat pump is in the heating mode. A defrost system comprises a bypass coolant loop in selective fluid communication with the first secondary coolant loop, a coolant heater, and a solenoid valve. When in the heating mode, the controller opens or confirms open the solenoid valve in the bypass coolant loop and activates the coolant heater upon detecting operation of the heat pump outside of a predetermined normal operating range and upon detecting an ambient temperature below a predetermined temperature. The controller de-activates the coolant heater upon detecting operation of the heat pump within the predetermined normal operating range.

Embodiments of the first aspect of the present disclosure can include any one or a combination of the following features:

When in the heating mode, the controller closes the solenoid valve in the bypass coolant loop upon detecting operation of the heat pump within the predetermined normal operating range.

the heat pump comprises a compressor for compressing a refrigerant, a condenser in fluid communication with the compressor for condensing the refrigerant from the compressor, an expansion valve disposed downstream of and in fluid communication with the condenser, and an evaporator disposed downstream of and in fluid communication with the expansion valve.

The heat pump circulates the refrigerant in a first direction in the cooling mode and the heat pump circulates the refrigerant in a second direction in the heating mode.

The first side heat exchanger operates as the condenser in the cooling mode and the first side heat exchanger operates as the evaporator in the heating mode, and the second side heat exchanger operates as the evaporator in the cooling mode and the second side heat exchanger operates as the condenser in the heating mode.

A first bypass valve is disposed downstream of the first side heat exchanger of the heat pump for selectively directing coolant flow to the first secondary coolant loop when in the cooling mode and selectively directing coolant flow to the second secondary coolant loop when in the heating mode.

A second bypass valve is disposed downstream of the second side heat exchanger of the heat pump for selectively directing coolant flow to the second secondary coolant loop when in the cooling mode and selectively directing coolant flow to the first secondary coolant loop when in the heating mode.

A third bypass valve is disposed downstream of and in fluid communication with the low temperature radiator for selectively directing coolant flow to the first side heat exchanger of the heat pump when in the cooling mode and selectively directing coolant flow to the second side heat exchanger of the heat pump when in the heating mode.

The motor vehicle further comprises a battery module in selective fluid communication with the second secondary coolant loop, and wherein the cooling and heating system further comprises:

A fourth bypass valve disposed downstream of the second bypass valve and the second side heat exchanger of heat pump when in the cooling mode for selectively directing coolant flow to the battery module when in the cooling mode.

The fourth bypass valve comprises a proportional valve controlled by the controller for selectively allowing coolant flow between and through each of the battery module and the passenger cabin heat exchanger.

A fifth bypass valve is disposed downstream of and in fluid communication with the battery module for selectively directing coolant flow to the second side heat exchanger of the heat pump when in the cooling mode and selectively directing coolant flow to the first side heat exchanger of the heat pump when in the heating mode.

The passenger cabin heat exchanger further comprises a cooling coil and a heater core, the cooling coil of the passenger cabin heat exchanger being in thermal communication with the second side heat exchanger of the heat pump when the heat pump is in the cooling mode and the heater core of the passenger cabin heat exchanger being in thermal communication with the first side heat exchanger of the heat pump when the heat pump is in the heating mode.

The refrigerant of the heat pump is liquid carbon dioxide (industry nomenclature R744 or R-744) and the coolant of the first secondary loop and second secondary loop is a glycol-water mixture.

The defrost system is disposed upstream of the low temperature radiator and further comprises a coolant storage and heating tank, and the coolant heater comprises a coolant electric resistance heating element disposed within the coolant storage and heating tank.

According to a second aspect of the present disclosure, a defrost system for a low temperature radiator of a cooling and heating system for a motor vehicle is disclosed. The cooling and heating system comprises a refrigerant-based heat pump having a first side heat exchanger and a second side heat exchanger, wherein the heat pump is adapted to operate in a cooling mode and a heating mode, and a controller for controlling operation and determining the operation of the cooling and heating system. A first secondary coolant loop comprises the low temperature radiator, the low temperature radiator being in thermal communication with the first side heat exchanger of the heat pump when the heat pump is in the cooling mode and the low temperature radiator being in thermal communication with the second side heat exchanger of the heat pump when the heat pump is in the heating mode. A second secondary coolant loop comprises a passenger cabin heat exchanger, the passenger cabin heat exchanger being in thermal communication with the second side heat exchanger of the heat pump when the heat pump is in the cooling mode and the passenger cabin heat exchanger being in thermal communication with the first side heat exchanger of the heat pump when the heat pump is in the heating mode.

The defrost system comprises a bypass coolant loop in selective fluid communication with the first secondary coolant loop and upstream of the low temperature radiator, a coolant storage and heating tank in series fluid communication within the bypass coolant loop, a coolant heater comprising a coolant electric resistance heating element disposed within the coolant storage and heating tank, and a solenoid valve in series fluid communication within the bypass coolant loop and with the coolant storage and heating tank. When in the heating mode, the controller opens or confirms open the solenoid valve in the bypass coolant loop and activates the coolant heater upon detecting operation of the heat pump outside of a predetermined normal operating range and upon detecting an ambient temperature below a predetermined temperature, and wherein the controller deactivates the coolant heater and closes the solenoid valve in the bypass coolant loop upon detecting operation of the heat pump within the predetermined normal operating range.

Embodiments of the second aspect of the present disclosure can include any one or a combination of the following features:

The vehicle further comprises a battery module in selective fluid communication with the second secondary coolant loop. A first bypass valve is disposed downstream of the first side heat exchanger of the heat pump for selectively directing coolant flow to the first secondary coolant loop when in the cooling mode and directing selectively coolant flow to the second secondary coolant loop when in the heating mode. A second bypass valve is disposed downstream of the second side heat exchanger of the heat pump for selectively directing coolant flow to the second secondary coolant loop when in the cooling mode and selectively directing coolant flow to the first secondary coolant loop when in the heating mode. A third bypass valve is disposed downstream of and in fluid communication with the low temperature radiator for selectively directing coolant flow to the first side heat exchanger of the heat pump when in the cooling mode and selectively directing coolant flow to the second side heat exchanger of the heat pump when in the heating mode. A fourth bypass valve is disposed downstream of the second bypass valve and the second side heat exchanger of heat pump when in the cooling mode for selectively directing coolant flow to the battery module when in the cooling mode.

The first secondary coolant loop includes a first coolant circulating pump disposed upstream or downstream of the first side heat exchanger of the heat pump and the second secondary coolant loop includes a second coolant circulating pump disposed upstream or downstream of the second side heat exchanger of the heat pump.

The fourth bypass valve comprises a proportional valve controlled by the controller for selectively allowing coolant flow between and through each of the battery module and the passenger cabin heat exchanger.

A control valve upstream of and in fluid communication with the battery module selectively directs coolant flow to the battery module when in the heating mode.

According to a third aspect of the present disclosure, a heat pump system for a motor vehicle comprises a refrigerant-based heat pump having a first side heat exchanger and a second side heat exchanger, wherein the heat pump is adapted to operate in a cooling mode and a heating mode, and a controller for controlling operation of the heat pump system. A first secondary coolant loop comprises a low temperature radiator, the low temperature radiator being in thermal communication with the first side heat exchanger of the heat pump when the heat pump is in the cooling mode and the low temperature radiator being in thermal communication with the second side heat exchanger of the heat pump when the heat pump is in the heating mode. A second secondary coolant loop comprises a passenger cabin heat exchanger, the passenger cabin heat exchanger being in thermal communication with the second side heat exchanger of the heat pump when the heat pump is in the cooling mode and the passenger cabin heat exchanger being in thermal communication with the first side heat exchanger of the heat pump when the heat pump is in the heating mode.

A defrost system comprises a bypass coolant loop in selective fluid communication with the first secondary coolant loop and upstream of the low temperature radiator, a coolant heater in series fluid communication within the bypass coolant loop, and a solenoid valve in series fluid communication within the bypass coolant loop and the coolant heater. When in the heating mode, the controller opens the solenoid valve in the bypass coolant loop and activates the coolant heater upon detecting operation of the heat pump outside of a predetermined normal operating range and upon detecting an ambient temperature below a predetermined temperature, and wherein the controller deactivates the coolant heater and closes the solenoid valve in the bypass coolant loop upon detecting operation of the heat pump within the predetermined normal operating range.

Embodiments of the third aspect of the present disclosure can include any one or a combination of the following features:

The defrost system further comprises a coolant storage and heating tank and the coolant heater comprises a coolant heating element disposed within the coolant storage and heating tank.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1A:
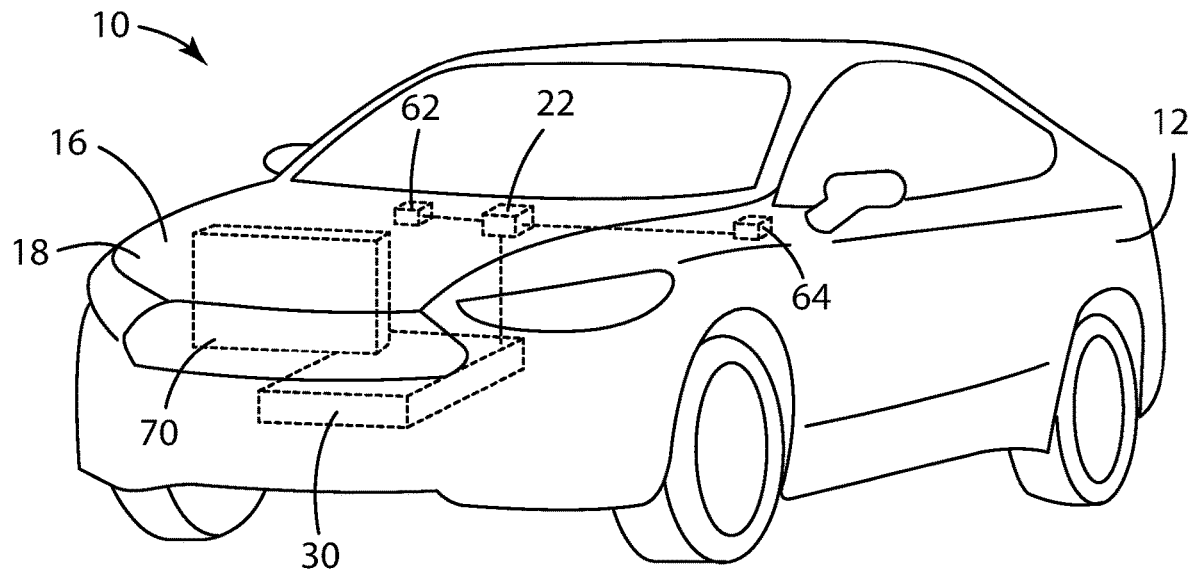
FIG. 1a is a perspective view of a motor vehicle equipped with the cooling and heating system comprising the defrost system of the present disclosure.

For purposes of description herein, the terms "upper," "lower," "right," "left," "rear," "front," "vertical," "horizontal," and derivatives thereof shall relate to the concepts as oriented in FIG. 1a. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations related to a defrost system for a motor vehicle heat pump. Accordingly, the components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone;

A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIG. 1a, reference numeral 10 generally designates the motor vehicle. The motor vehicle 10 may be a wheeled motor vehicle, a boat, a plane, a driver-controlled vehicle, and/or an autonomous vehicle. The motor vehicle 10 may be equipped with a body 12 defining therein an inside passenger cabin 14. The motor vehicle 10 may be a hybrid motor vehicle or entirely battery-powered, electric motor vehicle. In the present disclosure, the disclosed cooling and heating system 20 comprising a heat pump 30 is particularly advantageous in the case of an entirely battery-powered, electric motor vehicle 10, where the heat pump 30 may be used for both cooling and heating the inside passenger cabin 14.

Referring again to FIG. 1a, the automotive heat pump 30 of the cooling and heating system 20 may be mounted under a hood 18 within a forward compartment 16 of the body 12. The heat pump 30 may include an integrated system including a standard fluid-tight refrigerant closed loop that includes a condenser 32, an evaporator 34, a compressor 36, and an expansion valve 38 within which a refrigerant (such as liquid carbon dioxide or R-744) circulates as the working fluid. The cooling and heating system 20 may be controlled by a controller 22.

Figure 1B:
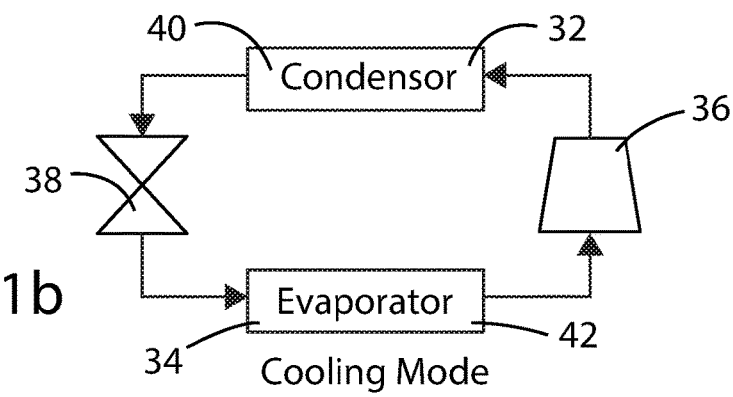
FIG. 1b is a schematic view of the heat pump operation of the cooling and heating system of the present disclosure in the cooling mode.
Figure 1C:
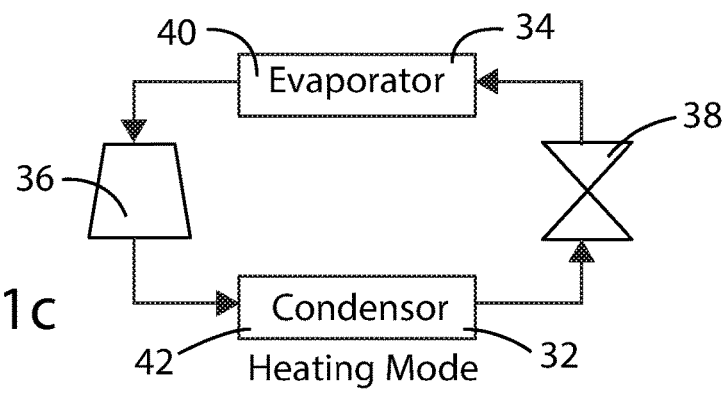
FIG. 1c is a schematic view of the heat pump operation of the cooling and heating system of the present disclosure in the heating mode.

In general operation, the heat pump 30 uses the refrigerant as an intermediate fluid to absorb heat as it is vaporized in the evaporator 34. The heat pump 30 then releases this heat as the refrigerant condenses in the condenser 32. The heat pump 30 may have both a cooling mode and a heating mode. That is, the heat pump 30 may work in either direction to provide cooling or heating to the inside passenger cabin 14, as the environmental circumstances dictate and the occupants of the motor vehicle 10 desire, as depicted in FIGS. 1b and 1c. The two modes may be switched between summer or winter conditions by using proportional valves (not shown), as is known. The heat pump 30 may also employ a reversing valve (not shown) to reverse the flow of refrigerant from the compressor 36 through the condenser 32 and evaporator 34.

In the cooling mode, shown in FIG. 1b, a first coil 40 is the condenser 32, while a second coil 42 is the evaporator 34. The refrigerant flowing from the condenser 32 (first coil 40) rejects thermal energy to the outside air. The first coil 40 thus transfers thermal energy to another medium. The refrigerant then flows to and is allowed to expand in the second coil 42 and, hence, cool and absorb heat energy from an air radiator or cooler coil 28 disposed within the inside passenger cabin 14, and the cycle repeats. This is a standard refrigeration cycle.

In the heating mode, shown in FIG. 1c, the cycle is similar, but the first coil 40 is the evaporator 34, while the second coil 42 (which reaches a higher temperature) is the condenser 32. The refrigerant flowing from the evaporator 34 (first coil 40) absorbs thermal energy from the outside air. Vapor temperature is augmented within the loop by compressing it. The second coil 42 then transfers this thermal energy (including energy from the compression) to another medium. The refrigerant condenses in the second coil 42, cools, and thus rejects heat to the inside passenger cabin 14, and the cycle repeats. In the case of an automotive application, the thermal energy from the second coil 42 is used to heat the inside passenger cabin 14 via another air radiator or heater core 24. This is a standard refrigeration cycle, except that the "cold" side of the heat pump 30 (the evaporator 34) is positioned so it is outside of the inside passenger cabin 14 where the environment is colder. When the system is operated in heat pump mode during cold ambient weather conditions, the heat rejected from the condenser 32 may be used to warm up the inside passenger cabin 14 through the heater core 24, with the cold ambient air being used to provide heat energy to the evaporator 34.

As noted above, in cold weather operation and in the heating mode, the outside heat exchanger unit or first coil 40 of a single loop air source heat pump needs to be intermittently defrosted and/or de-iced. In the case of a typical, single-loop heat pump 30, operation of the heat pump 30 in reverse may be used to cause the frost and/or ice on the first coil 40 to melt due to relatively warm refrigerant.

However, in addition to the heat pump 30 having the refrigerant loop described above, the cooling and heating system of the present disclosure includes a first secondary fluid loop 50 and a second secondary fluid loop 52. The first secondary fluid loop 50 and the second secondary fluid loop 52 may be configured as two separate secondary fluid loops, each using a 50% glycol-water mixture to exchange energy with the refrigerant loop of the heat pump 30. Each of the first and second secondary loops 50, 52 may be a closed-loop system. A first coolant circulating pump 54 actuated by first motor 56 circulates coolant within the first secondary fluid loop 50 and a second coolant circulating pump 58 actuated by a second motor 60 circulates coolant within the second secondary fluid loop 52.

In the cooling and heating system 20 of the present disclosure, the refrigerant-based heat pump 30 is provided with a first side heat exchanger 44 that is thermally coupled with the first coil 40 and a second side heat exchanger 46 that is thermally coupled with the second coil 42 and is adapted to operate in either a cooling mode and a heating mode. The first coolant circulating pump 54 may be disposed upstream (as shown) or downstream of the first side heat exchanger 44 of the heat pump 30, and the second coolant circulating pump 58 may be disposed upstream (as shown) or downstream of the second side heat exchanger 46 of the heat pump 30.

As described above, the heat pump 30 includes the compressor 36 for compressing a refrigerant, the condenser 32 being in fluid communication with the compressor 36 for condensing the refrigerant from the compressor 36, the expansion valve 38 being disposed downstream of and in fluid communication with the condenser 32, and the evaporator 34 disposed downstream of and in fluid communication with expansion valve 38. The heat pump 30 circulates the refrigerant in a first direction in the cooling mode and in a second direction in the heating mode. Thus, the first side heat exchanger 44 of the heat pump 30 operates as the condenser 32 in the cooling mode and as the evaporator 34 in the heating mode, while the second side heat exchanger 46 of the heat pump 30 operates as the evaporator 34 in the cooling mode and the condenser 32 in the heating mode.

Figure 2:
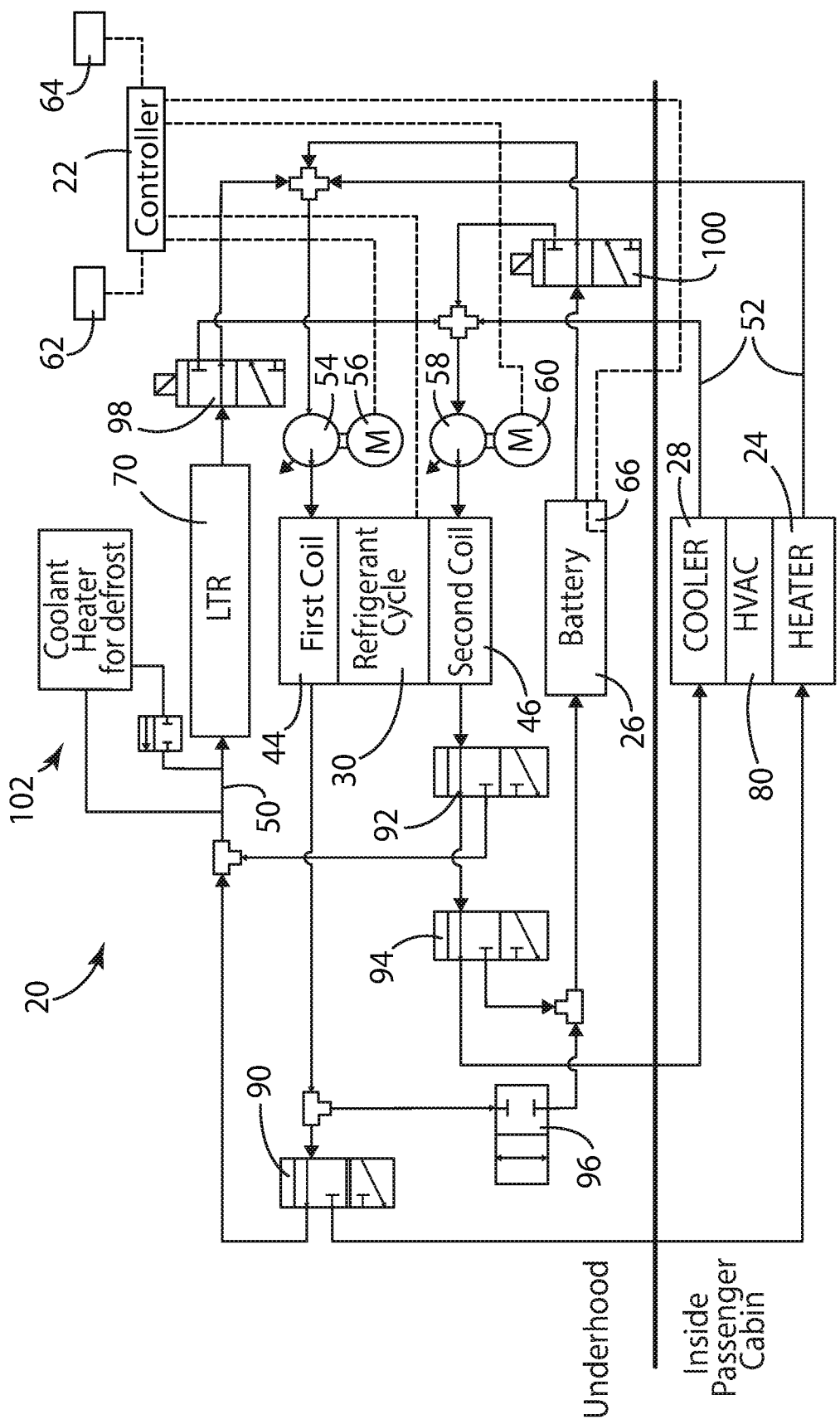
FIG. 2 is a schematic view of the motor vehicle cooling and heating system equipped with the defrost system of the present disclosure.

The operation of the cooling and heating system 20, including the heat pump 30, is controlled by the controller 22. As shown in FIGS. 1a and 2, the controller is in signal communication with an outside temperature sensor 62 exposed to ambient air and an inside temperature sensor 64 exposed to the air temperature within the inside passenger cabin 14. The controller 22 is also in signal communication with the first motor 56 of the first secondary coolant loop 52 and the second motor 60 of the second secondary coolant loop 52, as well as the heat pump 30 and the components therein. Thus, the controller 22 may determine the operating efficiency of the cooling and heating system by reference to predetermined operating conditions corresponding with a range of normal operating conditions for each of the first motor 56, second motor 60, and the heat pump 30 mapped against a range of temperatures of the ambient air and the inside passenger cabin 14. In addition, the controller 22 is in signal communication with a temperature sensor 66 disposed in a rechargeable battery module 26, as shown in FIG. 2 and further discussed below.

Figure 3:
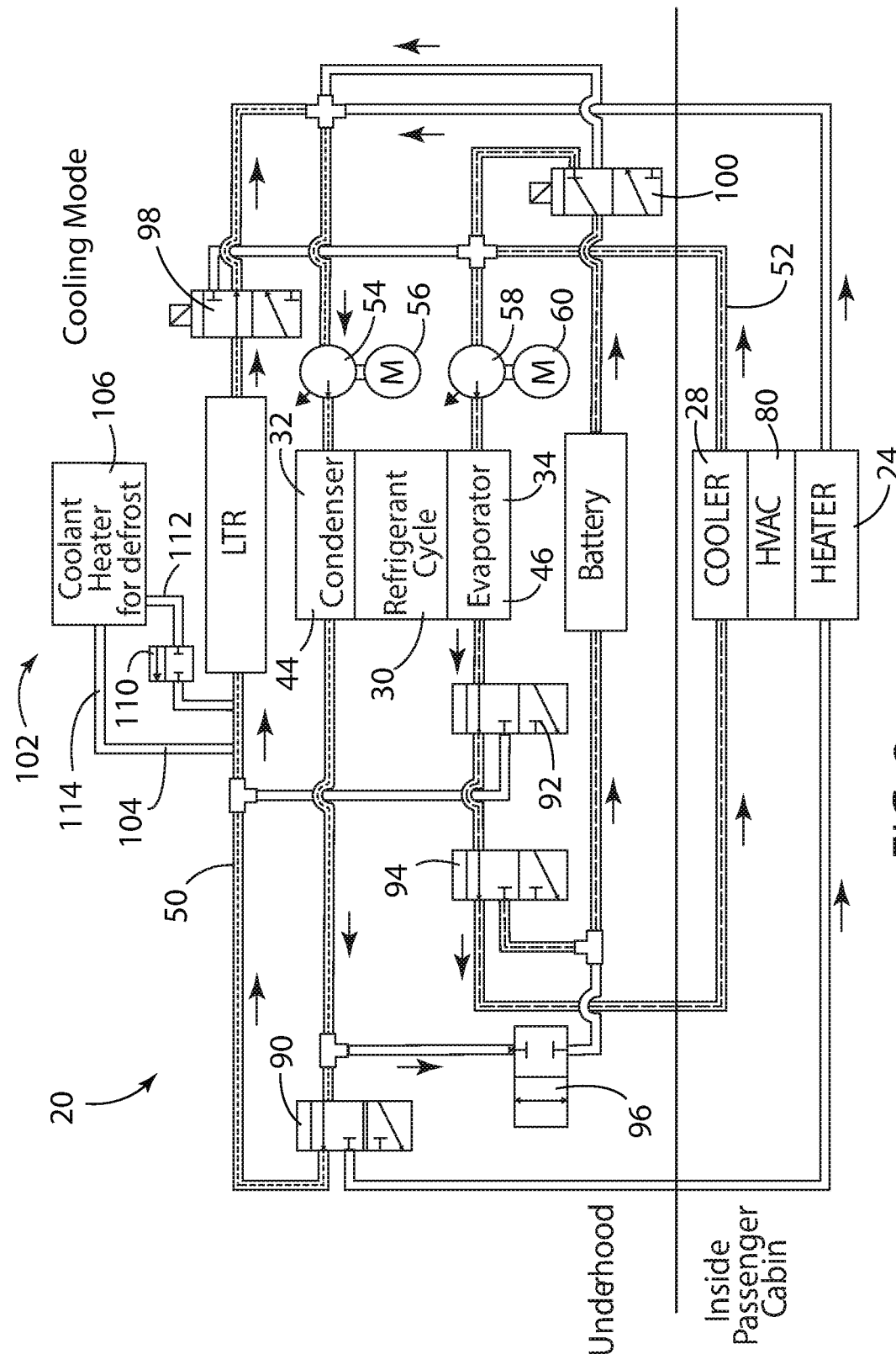
FIG. 3 is a schematic view of the motor vehicle cooling and heating system equipped with the defrost system of the present disclosure shown in FIG. 2 in a cooling mode.
Figure 4:
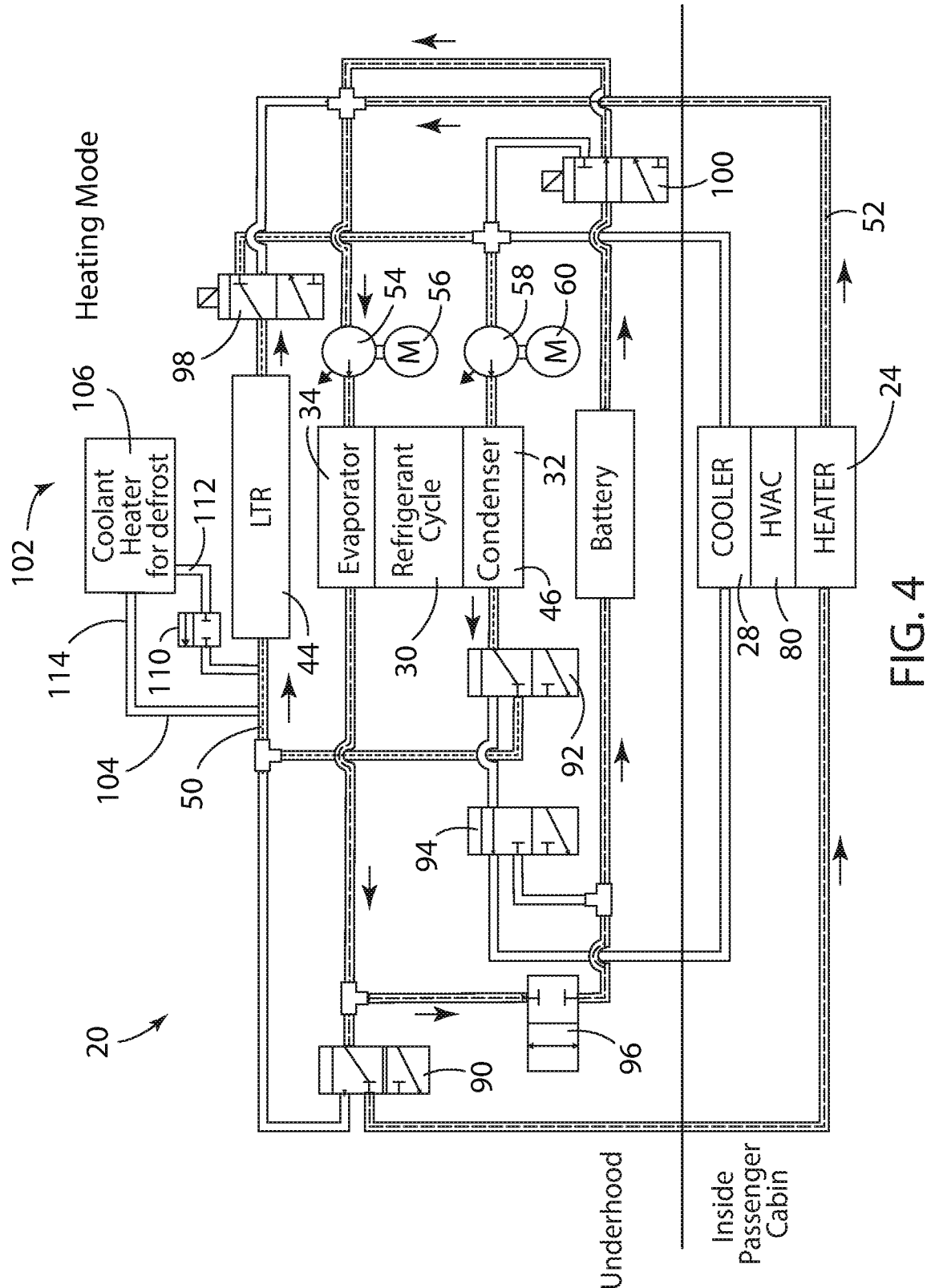
FIG. 4 is a schematic view of the motor vehicle cooling and heating system equipped with the defrost system of the present disclosure shown in FIG. 2 in a heating mode.
Figure 5:
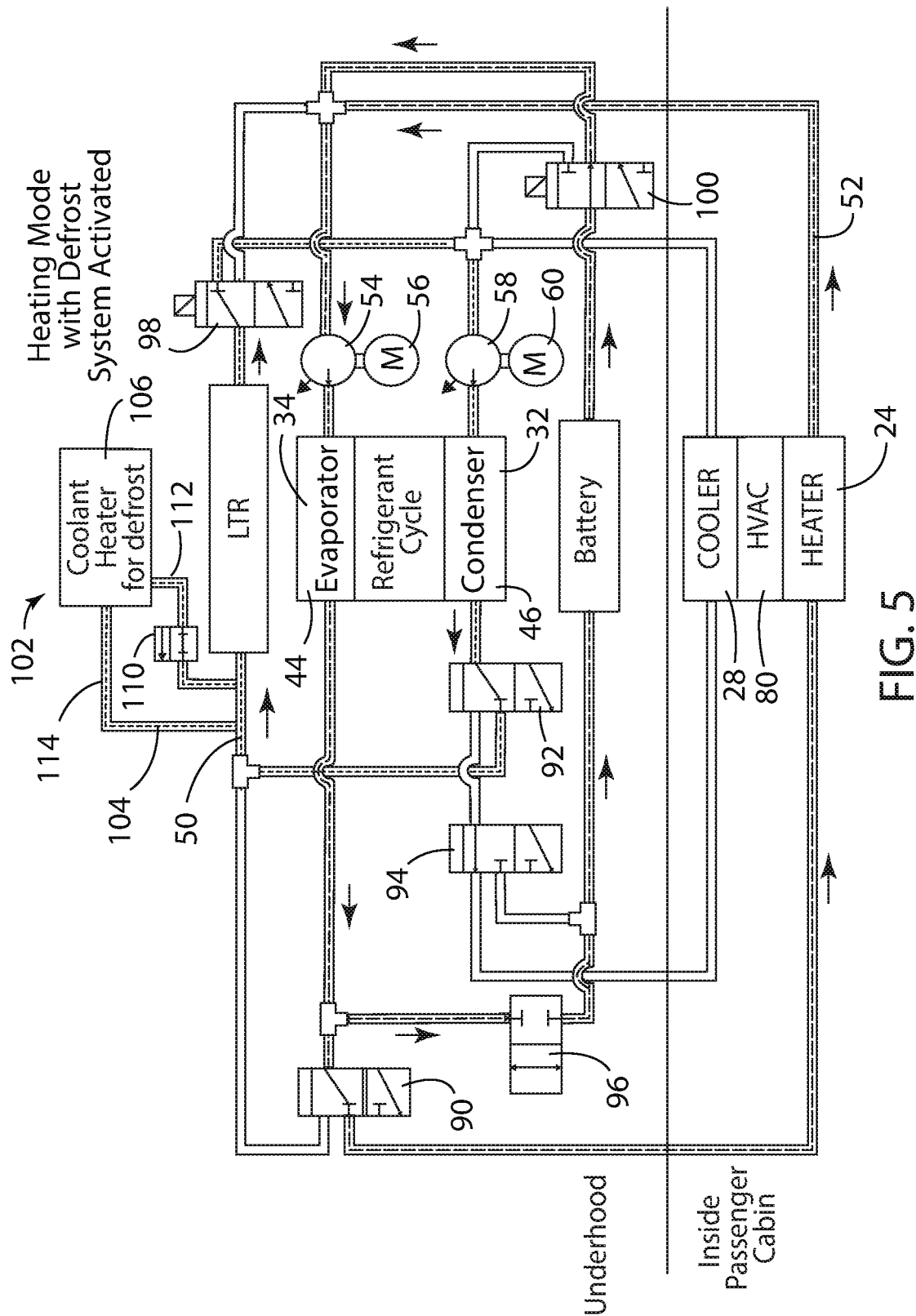
FIG. 5 is a schematic view of the motor vehicle cooling and heating system equipped with the defrost system of the present disclosure shown in FIG. 2 in a heating mode with the defrost system activated.

As shown in FIGS. 2-5, the first secondary coolant loop 50 comprises a low temperature radiator 70, sometimes referred to as an outside heat exchanger or OHX. The low temperature radiator 70 may be mounted in the forward compartment of the body 12 under the hood 18 and disposed so that ambient air flow may pass through the low temperature radiator 70, as shown in FIG. 1a. The low temperature radiator 70 is in thermal communication with the first side heat exchanger 44 of the heat pump 30 when the heat pump 30 is in the cooling mode, as shown in FIG. 3. The low temperature radiator 70 is in thermal communication with the second side heat exchanger 46 of the heat pump 30 when the heat pump 30 is in the heating mode, as shown in FIGS. 4 and 5.

As also shown in FIGS. 2-5, the second secondary coolant loop 52 comprises a passenger cabin heat exchanger 80. The passenger cabin heat exchanger 80 may be disposed within the inside passenger cabin 14 as part of the heating, ventilation, and cooling system thereof. The passenger cabin heat exchanger 80 is in thermal communication with the second side heat exchanger 46 of the heat pump 30 when the heat pump 30 is in the cooling mode, as shown in FIG. 3. Conversely, the passenger cabin heat exchanger 80 is in thermal communication with the first side heat exchanger 44 of the heat pump 30 when the heat pump 30 is in the heating mode, as shown in FIGS. 4 and 5.

The passenger cabin heat exchanger 80 may include the cooling coil 28 and the heater core 24 over which an air stream is directed by blower into a plenum (not shown) for distribution within the inside passenger cabin 14. As shown in FIG. 3, the cooling coil 28 of the passenger cabin heat exchanger 80 is in thermal communication with the second side heat exchanger 46 of the heat pump 30 when the heat pump 30 is in the cooling mode, and the heater core 24 of the passenger cabin heat exchanger 80 is in thermal communication with the first side heat exchanger 44 of the heat pump 30 when the heat pump 30 is in the heating mode.

The cooling and heating system 20 further includes a first bypass valve 90 disposed downstream of the first side heat exchanger 44 of the heat pump 30 for selectively directing coolant flow to the first secondary coolant loop 50 when in the cooling mode and selectively directing coolant flow to the second secondary coolant loop 52 when in the heating mode. A second bypass valve 92 is disposed downstream of the second side heat exchanger 46 of the heat pump 30 for selectively directing coolant flow to the second secondary coolant loop 52 when in the cooling mode and selectively directing coolant flow to the first secondary coolant loop 50 when in the heating mode. Each of the first and second bypass valves 90, 92 may comprise a proportional valve controlled by the controller 22 for selectively allowing coolant flow between and through each of the first and second secondary coolant loops 50, 52, and the low temperature radiator 70 and the passenger cabin heat exchanger 80, respectively.

The cooling and heating system 20 further may include a third bypass valve 98 disposed downstream of and in fluid communication with the low temperature radiator 70 for selectively directing coolant flow to the first side heat exchanger 44 of the heat pump 30 when in the cooling mode, as shown in FIG. 3, and selectively directing coolant flow to the second side heat exchanger 46 of the heat pump 30 when in the heating mode, as shown in FIGS. 4 and 5. The third bypass valve 98 may comprise a three-port solenoid valve controlled by the controller 22 for selectively allowing coolant flow between and through first side heat exchanger 44 and second side heat exchanger 46 of the heat pump 30, respectively.

The motor vehicle may also include the rechargeable battery module 26 for storing and supplying electrical energy to the electric drive motors (not shown) of the motor vehicle 10. Such battery modules 26 typically generate heat, particularly during charging from either an internal combustion engine, in the case of a hybrid motor vehicle, or regenerative braking systems common to both hybrid motor vehicles or entirely battery powered electric motor vehicles. During warm or hot ambient air operating conditions, it may be advantageous to provide cooling to the battery module 26 to improve its ability to hold a charge and otherwise extend its useful life. During cool or cold ambient air operation conditions, it also may be advantageous to harvest the heat energy generated by the battery module 26, again so as to cool the battery module 26 and to extend its useful life. The heat energy harvested from the battery module 26 may also be usefully added to the heat energy delivered to the inside passenger cabin 14 during the heating mode.

Thus, the second secondary coolant loop 52 of the cooling and heating system 20 may be placed in selective fluid communication with the battery module 26 as may be indicated to the controller 22 by the temperature sensor 66 disposed in a rechargeable battery module 26. To do so, the cooling and heating system 20 may include a fourth bypass valve 94 disposed downstream of the second bypass valve 92 and the second side heat exchanger 46 of heat pump 30 for selectively directing coolant flow to the battery module 26 when in the cooling mode, as best shown in FIG. 3. The fourth bypass valve 94 may comprise a proportional valve controlled by the controller 22 for selectively allowing coolant flow between and through each of the battery module 26 and the passenger cabin heat exchanger 80. The cooling and heating system 20 may also include a control valve 96 upstream of and in fluid communication with the battery module 26 for selectively directing coolant flow to the battery module 26 when in the heating mode, as shown in FIGS. 4 and 5.

Finally, the cooling and heating system 20 may also include a fifth bypass valve 100 disposed downstream of and in fluid communication with the battery module 26 for selectively directing coolant flow to the second side heat exchanger 46 of the heat pump 30 when in the cooling mode, as shown in FIG. 3, and selectively directing coolant flow to the first side heat exchanger 44 of the heat pump 30 when in the heating mode, as shown in FIGS. 4 and 5.

In operation in the cooling mode, where there is a call for cooling within the inside passenger cabin 14, the compressor 36 of the heat pump 30 is actuated and refrigerant inside the refrigerant loop of the heat pump 30 begins to flow in a first cooling direction. The first motor 56 for the first coolant circulating pump 54 is actuated to circulate coolant within the first secondary fluid loop 50 and the second motor 60 for the second coolant circulating pump 58 is actuated to circulate coolant within the second secondary fluid loop 52.

The refrigerant in the first side heat exchanger 44 of the heat pump 30, acting as the condenser, is thus placed in thermal communication with the first secondary coolant loop 50 and the low temperature radiator 70 disposed outside of the inside passenger cabin 14 of the motor vehicle 10 and exposed to ambient air by actuation of the first bypass valve 90 and the third bypass valve 98, as shown in FIG. 3. The refrigerant in the second side heat exchanger 46 of the heat pump 30, acting as the evaporator 34, is similarly placed in thermal communication with the second secondary coolant loop 52 and the passenger cabin heat exchanger 80 disposed in the inside passenger cabin 14 by actuation of the second bypass valve 92, as shown in FIG. 3. Thus, heat energy from the inside passenger cabin 14 is transported to the second side heat exchanger 46 of the heat pump 30, hence to the first side heat exchanger 44 of the heat pump 30, and ultimately to the low temperature radiator 70 exposed to ambient air. In the event that the battery module 26 may require cooling, the fourth bypass valve 94 and fifth bypass valve 100 may be opened to allow a portion of the coolant flow through the second secondary coolant loop 52 to flow through the battery module 26, as well as the passenger cabin heat exchanger 80 disposed in the inside passenger cabin 14.

In operation in the heating mode, where there is a call for heating within the inside passenger cabin 14, the heat pump 30 is actuated and refrigerant inside the refrigerant loop of the heat pump 30 begins to flow in a second cooling direction. The first motor 56 for the first coolant circulating pump 54 is again actuated to circulate coolant within the first secondary fluid loop 50 and the second motor 60 for the second coolant circulating pump 58 is again actuated to circulate coolant within the second secondary fluid loop 52.

The refrigerant in the first side heat exchanger 44 of the heat pump, now acting as the evaporator 34, is thus placed in thermal communication with the second secondary coolant loop 52 and the passenger cabin heat exchanger 80 disposed in the inside passenger cabin 14 by actuation of the first bypass valve 90, as shown in FIGS. 4 and 5. The refrigerant in the second side heat exchanger 46 of the heat pump 30, now acting as the condenser 32, is similarly placed in thermal communication with the first secondary coolant loop 50 and the low temperature radiator 70 disposed outside of the inside passenger cabin 14 of the motor vehicle 10 and exposed to ambient air by actuation of the second bypass valve 92 and third bypass valve 98, as also shown in FIGS. 4 and 5. Thus, heat energy from the outside ambient air is transported to the second side heat exchanger 46 of the heat pump 30, hence to the first side heat exchanger 44 of the heat pump 30, and ultimately to the passenger cabin heat exchanger 80 disposed in the inside passenger cabin 14. In the event that the controller determines that the battery module 26 may be available to provide additional heating, the control valve 96 and fifth bypass valve 100 may be opened to allow coolant to flow through the battery module 26 and to the first side heat exchanger 44 of the heat pump 30, where the heat energy of the battery module 26 may be usefully added to the heat energy provided to the first side heat exchanger 44 of the heat pump 30 and ultimately delivered to the passenger cabin heat exchanger 80 disposed in the inside passenger cabin 14.

As noted above, the low temperature radiator 70 is disposed outside of inside passenger cabin 14 of the motor vehicle 10. When operated in the heating mode by actuation of the second bypass valve 92 and third bypass valve 98, as also shown in FIGS. 4 and 5, the heat pump 30 is necessarily operated under cold conditions. When the ambient temperature reaches cold temperatures, such as 0° C., the moisture in the outside air can condense on the low temperature radiator 70 and freeze or cause icing, diminishing the performance of the low temperature radiator 70. At noted above, frost and ice buildup on the low temperature radiator 70 of the first secondary coolant loop 50 may have a significant impact on performance during cold ambient temperature operation. However, unlike conventional single loop heat pumps, simply operating the heat pump 30 refrigerant loop in reverse will not be effective to cause the frost and/or ice on the low temperature radiator 70 of the first secondary coolant loop 50 to melt.

Figure 6:
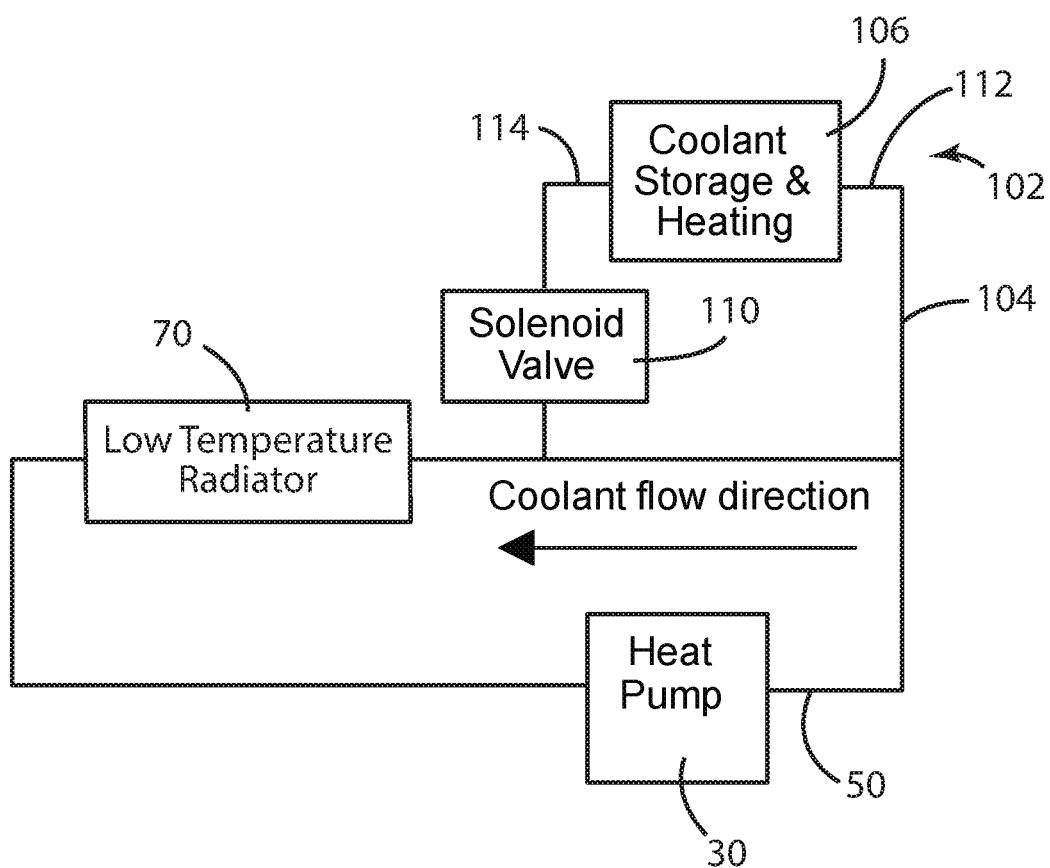
FIG. 6 is a schematic view of the defrost system of the present disclosure shown in FIG. 2.
Figure 7:
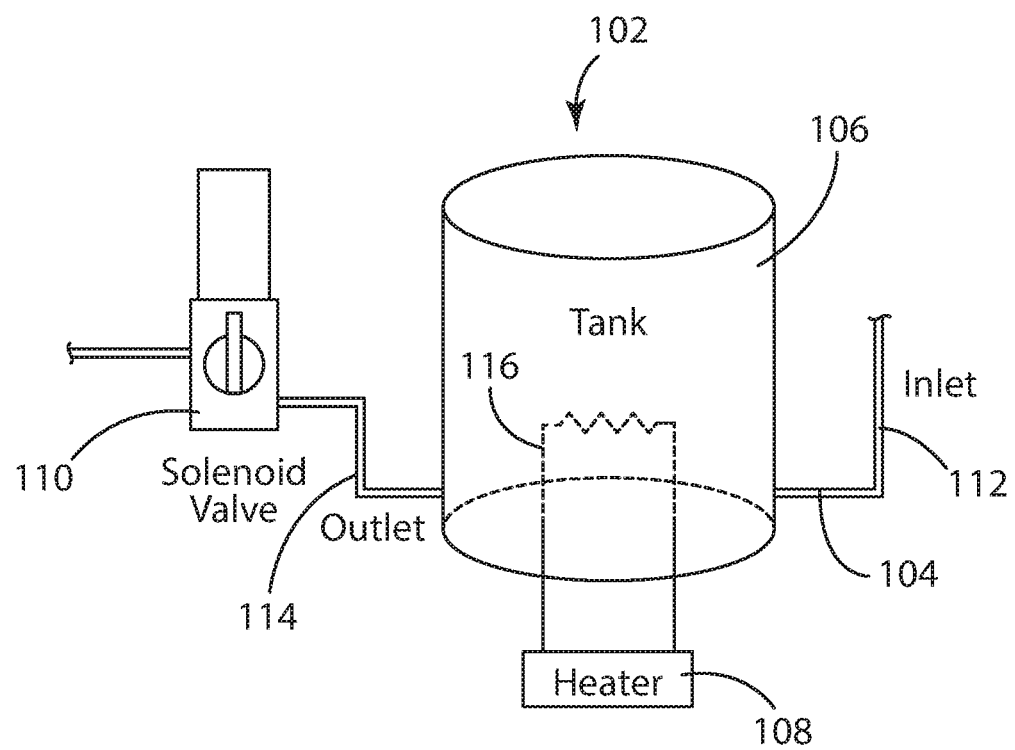
FIG. 7 is a schematic view of the coolant tank, heating element, and solenoid valve of the defrost system of the present disclosure shown in FIG. 2.

To address this issue, the cooling and heating system of the present disclosure is provided with a defrost system 102 for the low temperature radiator 70. The defrost system 102 includes a bypass coolant loop 104 in selective fluid communication with the first secondary coolant loop 50 upstream of the low temperature radiator 70, as shown in FIGS. 2-5, 6, and 7. The defrost system 102 further comprises a coolant storage and heating tank 106 in series fluid communication within the bypass coolant loop 104, a coolant heater 108, and a solenoid valve 110. The coolant storage and heating tank 106 has an inlet 112 and an outlet 114, where the solenoid valve 110 may be disposed downstream in the outlet 114 of the coolant storage and heating tank 106, as best shown in FIG. 6, to control the flow of coolant through the coolant storage and heating tank 106. The coolant heater 108 is disposed proximate the coolant storage and heating tank 106 and may comprise a coolant electric resistance heating element 116 extending into the coolant storage and heating tank 106 so as to provide heat energy to the coolant contained therein.

Figure 8:
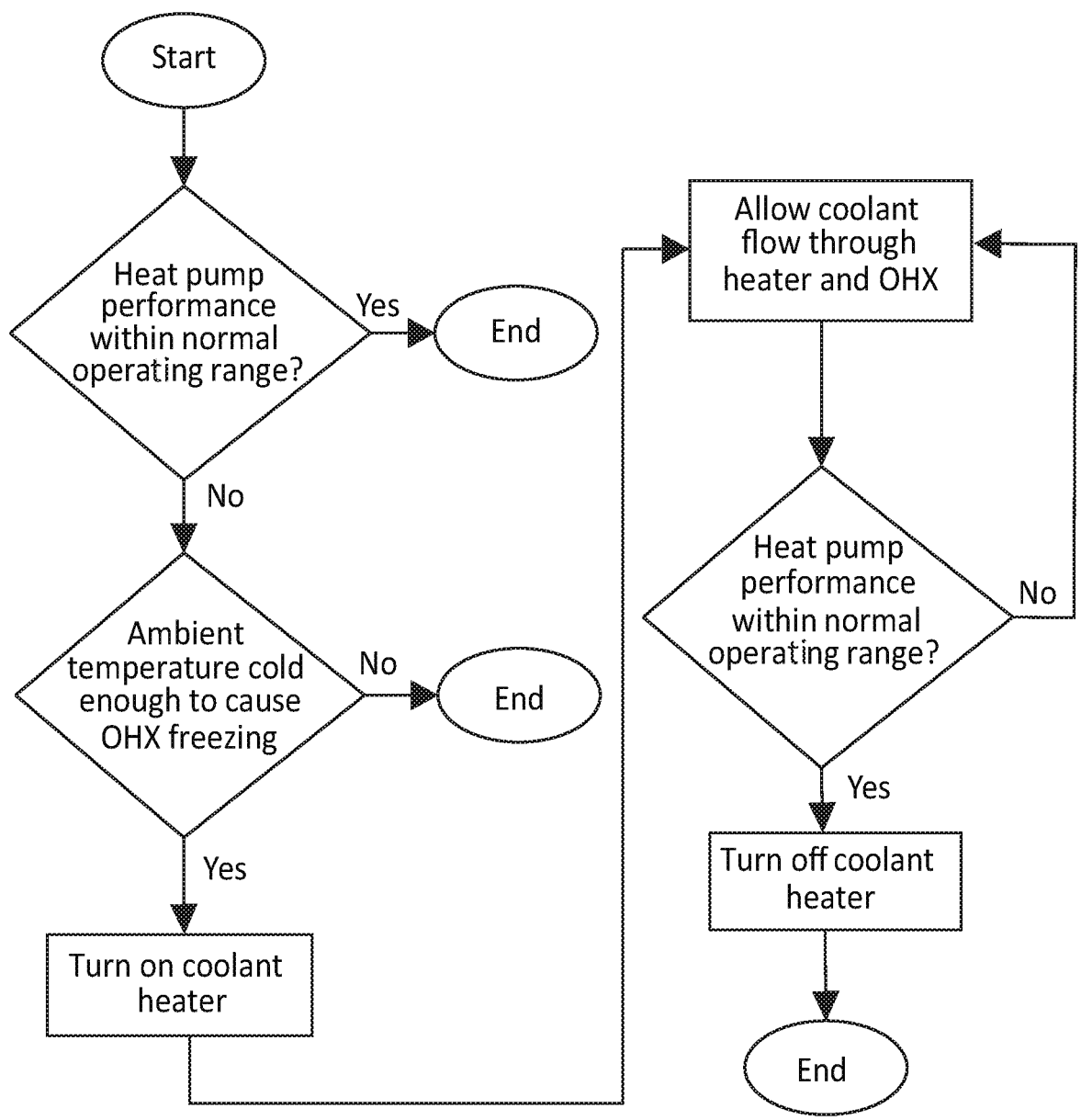
FIG. 8 is a flow chart of the operation of the defrost system of the present disclosure shown in FIG. 2

Thus, as depicted in the flow chart of the control strategy shown in FIG. 8, when in the heating mode and upon detecting operation of the heat pump 30 outside of a predetermined normal operating range and upon detecting an ambient temperature below a predetermined temperature (e.g., 0° C.), the controller 22 activates the coolant heater 108 and opens or confirms open the solenoid valve 110 in the bypass coolant loop 104. Conversely, upon detecting reestablished operation of the heat pump 30 within the predetermined normal operating range, the controller 22 may then de-activate the coolant heater 108 in order to conserve energy. The controller 22 may then also close the solenoid valve 110 in the bypass coolant loop 104 upon detecting operation of the heat pump 30 within the predetermined normal operating range.

Accordingly, if the controller 22 of the cooling and heating system 20 detects that the low temperature radiator 70 may covered in frost and/or ice, the controller 22 activates the coolant heater 108 in the coolant storage and heating tank 106 (as the heating source) and opens the solenoid valve 110 to allow coolant flow through the coolant storage and heating tank 106. The relatively warm coolant then flows directly to and through the low temperature radiator 70, thereby removes any accumulating frost and/or ice, and improving cooling and heating system 20 performance in the heating mode. The coolant heater 108 is operated to warm the coolant flowing to and through the low temperature radiator 70 only when necessary to thaw the low temperature radiator 70 and keep the cooling and heating system 20 performance at its peak.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A cooling and heating system for a motor vehicle comprising:
   a refrigerant-based heat pump having a first side heat exchanger and a second side heat exchanger, wherein the heat pump is adapted to operate in a cooling mode and a heating mode;
   a controller for controlling operation of the cooling and heating system;
   a first secondary coolant loop comprising a low temperature radiator, the low temperature radiator being in thermal communication with the first side heat exchanger of the heat pump when the heat pump is in the cooling mode and the low temperature radiator being in thermal communication with the second side heat exchanger of the heat pump when the heat pump is in the heating mode;
   a second secondary coolant loop comprising a passenger cabin heat exchanger, the passenger cabin heat exchanger being in thermal communication with the second side heat exchanger of the heat pump when the heat pump is in the cooling mode and the passenger cabin heat exchanger being in thermal communication with the first side heat exchanger of the heat pump when the heat pump is in the heating mode; and
   a defrost system comprising a bypass coolant loop in selective fluid communication with the first secondary coolant loop, a coolant heater, and a solenoid valve;
   wherein, in the heating mode, the controller opens or confirms open the solenoid valve in the bypass coolant loop and activates the coolant heater upon detecting that the low temperature radiator is covered in frost and/or ice and upon detecting an ambient temperature below a predetermined temperature, and wherein the controller de-activates the coolant heater upon detecting that the low temperature radiator is not covered in frost and/or ice.

2. The cooling and heating system of claim 1, wherein, in the heating mode, the controller closes the solenoid valve in the bypass coolant loop upon detecting that the low temperature radiator is not covered in frost and/or ice.

3. The cooling and heating system of claim 1, the heat pump comprises:
   compressor for compressing a refrigerant;
   a condenser in fluid communication with the compressor for condensing the refrigerant from the compressor;
   an expansion valve disposed downstream of and in fluid communication with the condenser; and
   an evaporator disposed downstream of and in fluid communication with expansion valve;
   wherein the heat pump circulates the refrigerant in a first direction in the cooling mode and the heat pump circulates the refrigerant in a second direction in the heating mode.

4. The cooling and heating system of claim 3, wherein the first side heat exchanger operates as the condenser in the cooling mode and the first side heat exchanger operates as the evaporator in the heating mode; and the second side heat exchanger operates as the evaporator in the cooling mode and the second side heat exchanger operates as the condenser in the heating mode.

5. The cooling and heating system of claim 4, further comprising:

a first bypass valve disposed downstream of the first side heat exchanger of the heat pump for selectively directing coolant flow to the first secondary coolant loop when in the cooling mode and selectively directing coolant flow to the second secondary coolant loop when in the heating mode.

6. The cooling and heating system of claim 5, further comprising:

a second bypass valve disposed downstream of the second side heat exchanger of the heat pump for selectively directing coolant flow to the second secondary coolant loop when in the cooling mode and selectively directing coolant flow to the first secondary coolant loop when in the heating mode.

7. The cooling and heating system of claim 6, further comprising:

a third bypass valve disposed downstream of and in fluid communication with the low temperature radiator for selectively directing coolant flow to the first side heat exchanger of the heat pump when in the cooling mode and selectively directing coolant flow to the second side heat exchanger of the heat pump when in the heating mode.

8. The cooling and heating system of claim 7, wherein the motor vehicle further comprises a battery module in selective fluid communication with the second secondary coolant loop, and wherein the cooling and heating system further comprises:

a fourth bypass valve disposed downstream of the second bypass valve and the second side heat exchanger of heat pump when in the cooling mode for selectively directing coolant flow to the battery module when in the cooling mode.

9. The cooling and heating system of claim 8, wherein the fourth bypass valve comprises a proportional valve controlled by the controller for selectively allowing coolant flow between and through each of the battery module and the passenger cabin heat exchanger.

10. The cooling and heating system of claim 8, further comprising a fifth bypass valve disposed downstream of and in fluid communication with the battery module for selectively directing coolant flow to the second side heat exchanger of the heat pump when in the cooling mode and selectively directing coolant flow to the first side heat exchanger of the heat pump when in the heating mode.

11. The cooling and heating system of claim 7, wherein the passenger cabin heat exchanger further comprises a cooling coil and a heater core, the cooling coil of the passenger cabin heat exchanger being in thermal communication with the second side heat exchanger of the heat pump when the heat pump is in the cooling mode and the heater core of the passenger cabin heat exchanger being in thermal communication with the first side heat exchanger of the heat pump when the heat pump is in the heating mode.

12. The cooling and heating system of claim 1, wherein the heat pump includes a refrigerant comprising liquid carbon dioxide (industry nomenclature R744 or R-744) and the first secondary coolant loop and the second secondary coolant loop include a coolant comprising a glycol-water mixture.

13. The cooling and heating system of claim 1, wherein the defrost system is disposed upstream of the low temperature radiator and further comprises a coolant storage and heating tank, and the coolant heater comprises a coolant electric resistance heating element disposed within the coolant storage and heating tank.

14. A defrost system for a low temperature radiator of a cooling and heating system for a motor vehicle, the cooling and heating system comprising:

a refrigerant-based heat pump having a first side heat exchanger and a second side heat exchanger, wherein the heat pump is adapted to operate in a cooling mode and a heating mode;

a controller for controlling operation and determining the operation of the cooling and heating system;

a first secondary coolant loop comprising the low temperature radiator, the low temperature radiator being in thermal communication with the first side heat exchanger of the heat pump when the heat pump is in the cooling mode and the low temperature radiator being in thermal communication with the second side heat exchanger of the heat pump when the heat pump is in the heating mode; and a second secondary coolant loop comprising a passenger cabin heat exchanger, the passenger cabin heat exchanger being in thermal communication with the second side heat exchanger of the heat pump when the heat pump is in the cooling mode and the passenger cabin heat exchanger being in thermal communication with the first side heat exchanger of the heat pump when the heat pump is in the heating mode;

wherein the defrost system comprises a bypass coolant loop in selective fluid communication with the first secondary coolant loop and upstream of the low temperature radiator, a coolant storage and heating tank in series fluid communication within the bypass coolant loop, a coolant heater comprising a coolant electric resistance heating element disposed within the coolant storage and heating tank, and a solenoid valve in series fluid communication within the bypass coolant loop and with the coolant storage and heating tank;

wherein, in the heating mode, the controller opens or confirms open the solenoid valve in the bypass coolant loop and activates the coolant heater upon detecting that the low temperature radiator is covered in frost and/or ice and upon detecting an ambient temperature below a predetermined temperature, and wherein the controller de-activates the coolant heater and closes the solenoid valve in the bypass coolant loop upon detecting that the low temperature radiator is not covered in frost and/or ice.

15. The defrost system of claim 14, wherein the first secondary coolant loop includes a first coolant circulating pump disposed upstream or downstream of the first side heat exchanger of the heat pump and the second secondary coolant loop includes a second coolant circulating pump disposed upstream or downstream of the second side heat exchanger of the heat pump.

16. The defrost system of claim 14, wherein the vehicle further comprises a battery module in selective fluid communication with the second secondary coolant loop, and wherein the cooling and heating system further comprises:

a first bypass valve disposed downstream of the first side heat exchanger of the heat pump for selectively directing coolant flow to the first secondary coolant loop when in the cooling mode and directing selectively coolant flow to the second secondary coolant loop when in the heating mode;

a second bypass valve disposed downstream of the second side heat exchanger of the heat pump for selectively directing coolant flow to the second secondary coolant loop when in the cooling mode and selectively directing coolant flow to the first secondary coolant loop when in the heating mode;

a third bypass valve disposed downstream of and in fluid communication with the low temperature radiator for selectively directing coolant flow to the first side heat exchanger of the heat pump when in the cooling mode and selectively directing coolant flow to the second side heat exchanger of the heat pump when in the heating mode; and a fourth bypass valve disposed downstream of the second bypass valve and the second side heat exchanger of heat pump when in the cooling mode for selectively directing coolant flow to the battery module when in the cooling mode.

17. The defrost system of claim 16, wherein the fourth bypass valve comprises a proportional valve controlled by the controller for selectively allowing coolant flow between and through each of the battery module and the passenger cabin heat exchanger.

18. The defrost system of claim 16, further comprising a control valve upstream of and in fluid communication with the battery module for selectively directing coolant flow to the battery module when in the heating mode.

19. A heat pump system for a motor vehicle comprising:
a refrigerant-based heat pump having a first side heat exchanger and a second side heat exchanger, wherein the heat pump is adapted to operate in a cooling mode and a heating mode;
a controller for controlling operation of the heat pump system;
a first secondary coolant loop comprising a low temperature radiator, the low temperature radiator being in thermal communication with the first side heat exchanger of the heat pump when the heat pump is in the cooling mode and the low temperature radiator being in thermal communication with the second side heat exchanger of the heat pump when the heat pump is in the heating mode;
a second secondary coolant loop comprising a passenger cabin heat exchanger, the passenger cabin heat exchanger being in thermal communication with the second side heat exchanger of the heat pump when the heat pump is in the cooling mode and the passenger cabin heat exchanger being in thermal communication with the first side heat exchanger of the heat pump when the heat pump is in the heating mode; and
a defrost system comprising a bypass coolant loop in selective fluid communication with the first secondary coolant loop and upstream of the low temperature radiator, a coolant heater in series fluid communication within the bypass coolant loop, and a solenoid valve in series fluid communication within the bypass coolant loop and the coolant heater;
wherein, in the heating mode, the controller opens the solenoid valve in the bypass coolant loop and activates the coolant heater upon detecting that the low temperature radiator is covered in frost and/or ice and upon detecting an ambient temperature below a predetermined temperature, and wherein the controller deactivates the coolant heater and closes the solenoid valve in the bypass coolant loop upon detecting that the low temperature radiator is not covered in frost and/or ice.

20. The defrost system of claim 19, wherein the defrost system further comprises a coolant storage and heating tank and the coolant heater comprises a coolant heating element disposed within the coolant storage and heating tank.

* * * * *